(12) United States Patent
Kondo et al.

(10) Patent No.: US 7,141,753 B2
(45) Date of Patent: Nov. 28, 2006

(54) ARC STUD WELDING DEVICE AND METHOD

(75) Inventors: Yoshiteru Kondo, Toyohashi (JP); Daisuke Miura, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 11/144,644

(22) Filed: Jun. 6, 2005

(65) Prior Publication Data

US 2005/0218119 A1    Oct. 6, 2005

Related U.S. Application Data

(63) Continuation of application No. 11/065,265, filed on Feb. 25, 2005, now abandoned.

(30) Foreign Application Priority Data

Mar. 1, 2004    (JP) .............................. 2004-056513

(51) Int. Cl.
*B23K 9/20*    (2006.01)

(52) U.S. Cl. .......................................... 219/99; 219/98

(58) Field of Classification Search .................. 219/98, 219/99
See application file for complete search history.

(56) References Cited

U.S. PATENT DOCUMENTS 5,317,123 A    5/1994    Ito ................................ 219/98
5,321,226 A *  6/1994    Raycher ........................ 219/98
5,977,506 A *  11/1999   von Daniken ................ 219/99
6,011,234 A *  1/2000    Kirchner et al. .............. 219/98

FOREIGN PATENT DOCUMENTS

| JP | 4-279280 | 10/1992 |
| JP | 5-49172 | 6/1993 |
| WO | WO 96/11767 | 4/1996 |

* cited by examiner

*Primary Examiner*—Clifford C. Shaw
(74) *Attorney, Agent, or Firm*—Miles & Stockbridge P.C.

(57) ABSTRACT

An arc stud welding device and method are provided, in which a stud is pulled up to an appropriate predetermined height, even after a portion of a flexible base material is dented by the stud and has returned to an original flat condition. A controller operates a linear motor to disengage the stud from the base material, operates a power source to generate a pilot arc and a main arc, and reverses the operation of the linear motor to press the stud against the base material for welding. When the stud is pulled up from the base material, the controller detects the position of disengagement of the stud from the base material, and the linear motor pulls up the stud to a predetermined position.

6 Claims, 2 Drawing Sheets

ARC STUD WELDING DEVICE AND METHOD

CROSS-REFERENCE TO RELATED APPLICATIONS

This application is a continuation of application Ser. No. 11/065,265 filed Feb. 25, 2005 now abandoned. This application also claims the benefit of Japanese Application No. 2004-056513 filed Mar. 1, 2004, incorporated herein by reference.

BACKGROUND OF THE INVENTION

The present invention relates to an arc stud welding device and method that applies electric power between a stud and a base material, generates a low current pilot arc between the stud and the base material, subsequently generates a high current main arc, and welds the stud to the base material.

In arc discharge welding, the arc stud welding device applies electric power between a stud and a base material, generates a low current pilot arc between the stud and the base material, subsequently generates a high current main arc, and welds the stud to the base material. This type of arc discharge welding is commonly known as drawn arc stud welding. One of these arc stud welding devices is disclosed in Japanese Unexamined Patent Application Publication [Kokai] No. 4-279280 (Patent Document 1: Japanese Patent No. 2,984,392).

The arc stud welding device disclosed in Japanese Unexamined Patent Application Publication [Kokai] No. 5-49172 (Patent Document 2) detects the current and voltage of the supplied electric power and controls the pilot arc current in order to generate an appropriate pilot arc. The arc stud welding device disclosed in Japanese Unexamined Patent Application Publication [Kokai] No. 2002-514972 (Patent Document 3: International Patent Application Publication No. WO96/11767) uses a reduced mass magnetic coil linear motor to move the stud holder at the tip of the welding gun.

In arc stud welding, power from the electric power source is applied to the base material and the stud brought into contact with the portion of the base material to be welded, the linear motor is operated to pull up the stud from the base material, a low current pilot arc is generated, the stud is pulled up farther while the pilot arc is being generated, a large current main arc is generated, the stud tip and the welded portion of the base material are melted, the linear motor is operated for a time allowing for sufficient melting, the stud is brought back into contact with the welded portion of the base material, and the stud is welded to the base material at a predetermined position.

In arc stud welding, the stud is brought into contact with the base material at the start of the welding operation. However, if the base material is flexible, and not rigid, the welded portion may become dented when the stud is brought into contact with it. As a result, the stud may sink below the level of the rest of the base material. When pulled up to generate the arc, the stud has to be raised to a predetermined height from the position where it made contact with the base material. However, if the base material was dented when the stud was brought into contact with it but returns to its original height when the stud is no longer bearing down on it, the stud pull up height is insufficient. If the pull up height is insufficient, the length of the generated arc is also insufficient and the resultant welding may be defective. If the sink-in depth due to stud contact is greater than the predetermined pull up height for the stud, the stud may not disengage when the base material returns to its original level. This makes arc generation impossible.

BRIEF DESCRIPTION OF THE INVENTION

The present invention provides an arc stud welding device and method in which the stud is pulled up to the appropriate predetermined height even after the portion of the base material dented by the stud welding has retuned to the original flat level.

In one, non-limiting, embodiment, the present invention is an arc stud welding device comprising a welding gun holding a stud in the tip, a linear motor for bringing the held stud into contact with, and disengaging the stud from contact with, a base material, a position sensor for detecting the position of the stud held at the tip of the welding gun with respect to the base material, a power source for supplying power to the stud held at the tip of the welding gun and the base material, and a controller for generating an arc discharge between the stud and the base material to weld the stud to the base material. The controller applies power from the power source to the base material and the stud in contact with the base material, operates the linear motor to pull up the stud from the base material, generates a main arc with a main current after a pilot arc has been generated, and operates the linear motor to press the stud against the base material and weld the stud to the base material. In that embodiment, the controller receives a signal from the position sensor when the stud disengages from the base material and detects the disengaged position, and the linear motor is then operated to pull up the stud from the disengaged position to a predetermined position.

Because the stud is pulled up to a predetermined height after the disengagement of the stud from the base material has been reliably detected at the disengagement position, the stud is pulled up properly from the surface of the base material even when the portion of the base material dented by contact with the stud has returned to its original flat level. As a result, the pilot arc and subsequent main arc are generated properly, and poor welding due to insufficient stud pull up is avoided.

In a preferred, but non-limiting, embodiment, a detector for detecting the electric current flowing from the power source through the stud and the base material is disposed in the controller, and the controller detects the disengaged position by obtaining the change in the electric current from the detector due to the disengagement of the stud from the base material. Also, the position sensor preferably outputs a position signal indicating the distance the stud has moved, the controller identifies a position signal from the position sensor when the disengagement position has been detected, as a reference position, and the controller performs the stud pull up operation with the linear motor until a position signal corresponding to a predetermined pull up length from the reference position has been received from the position sensor.

BRIEF DESCRIPTION OF THE DRAWINGS

The invention will be further described in conjunction with the accompanying drawings, which illustrate a preferred (best mode) embodiment, and wherein.

Figure 1:
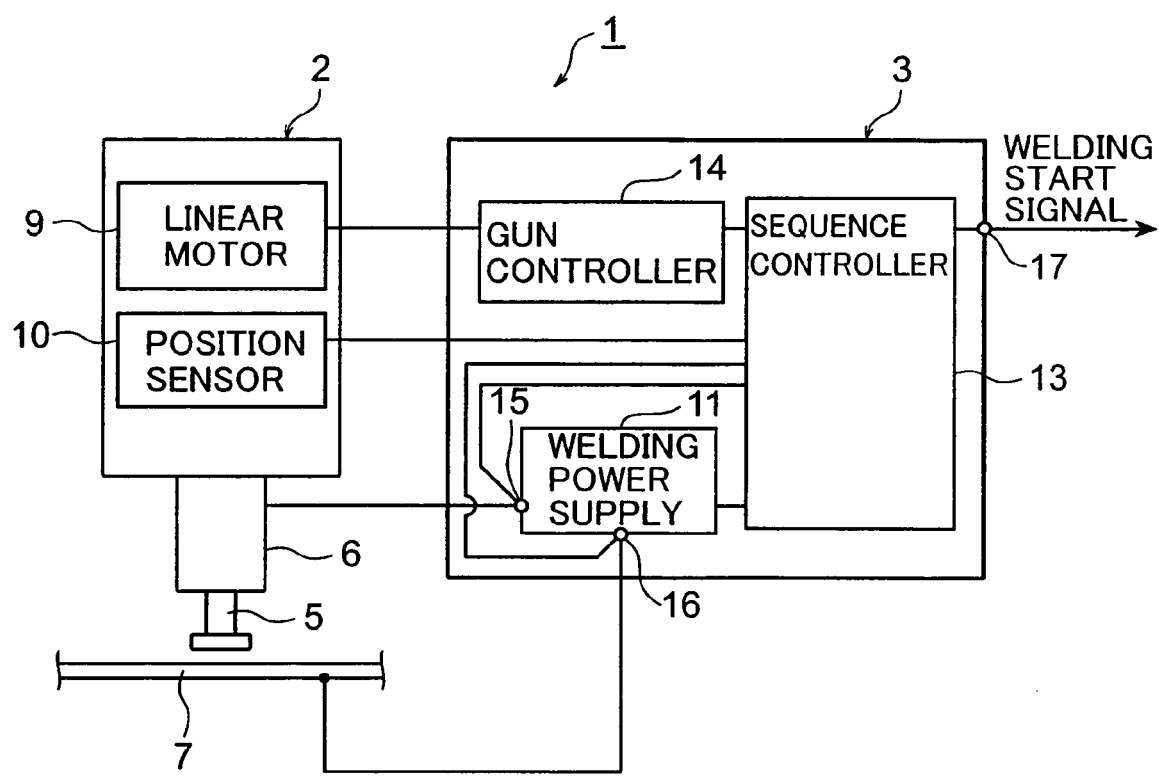
FIG. 1 is a block diagram of one embodiment of an arc stud welding device in accordance with the invention.

In this figure, (a) shows a stud held by the stud welding gun, (b) shows the stud brought into contact with the base material, (c) shows the stud bearing down on the base material, (d) shows the stud being pulled up from the base material so as to disengage from the base material, (e) shows the main arc generated between the stud and the base material, (f) shows the stud brought into contact with the melted portion of the base material, and (g) shows the stud welding gun disengaged from the stud welded to the base material.

DETAILED DESCRIPTION OF THE INVENTION

The following is a description of a preferred, but non-limiting, embodiment of the invention. A stud welding gun 2 comprises a stud holder 6 for holding the stud 5 at the tip, and a linear motor 9 operating along a single axis for bringing the stud 5 held in the stud holder 6 into contact with the base material 7 and disengaging the stud from the base material. A position sensor 10 is disposed in the stud welding gun 2 to detect the distance between the held stud 5 and the base material 7, or the position of the stud 5 relative to the base material. Any suitable position sensor 10 that can detect the position of the stud 5 relative to the base material 7 and output a position signal can be used. For example, in one embodiment, the position sensor 10 is fixed to the stud holder 6 for the stud 5 moved by the linear motor 9 and has a scale comprising holes formed at predetermined intervals along the axis of movement. A light emitting element (LED) and a light receiving element are fixed to the housing of the stud welding gun 2 so as to be stationary with respect to the base material 7. As the light between the light emitting element and light receiving element moves along the scale, a pulse signal is outputted each time a light pulse is received by the light receiving element through one of the holes. An optical position encoder can also be used if patterns with different shapes are formed for the contact holes corresponding to their height. In this case, the output from the position sensor is a code signal corresponding to the position. When an optical position sensor is used, the adverse effect of noise caused by the welding current can be reduced.

A welding power source 11 is disposed in the controller 3 to generate an arc discharge between the stud 5 held by the stud holder 6 in the stud welding gun 2 and the base material 7. A sequence controller 13 is also disposed in the controller 3. The sequence controller 13 controls the series of welding operations performed to weld the stud 5 to the base material 7 in which the stud 5 is pressed down onto the base material 7 to establish contact with the base material, power is applied from the welding power source 11 to the base material and the stud, the linear motor 9 is operated to pull up the stud from the base material, a pilot arc is generated, the stud is pulled up more and the large current main arc is generated, the stud tip and the welded portion of the base material are melted, and the linear motor is operated after melting to press the stud into the melted portion of the base material and weld them together. In order to perform these controls, the sequence controller 13 preferably comprises a calculation processor such as a microprocessor, RAM and ROM for storing programs and data, a memory device such as a hard drive, a user interface such as a keyboard and monitor display, and other devices to perform operations according to a predetermined program. A gun controller 14 is also disposed in the controller 3 to supply control signals from the sequence controller 13 as drive signals to the linear motor 9 in the stud welding gun 2. Position signals from the position sensor 10 are inputted and sent to the sequence controller 13 in the controller 3.

A detector (not shown) is disposed in the controller 3 for detecting the current flowing from the welding power source 11 through the stud 5 and the base material 7. In one example, voltage signals are inputted to the sequence controller 13 from two terminals, the terminal 15 connected to the stud 5 and the terminal 16 connected to the base material 7, on the welding power source 11. When the stud 5 is in contact with the base material 7, the current flowing through the stud 5 and the base material 7 is nearly at 0 V. When the stud 5 is pulled up to generate a pilot arc, there is hardly any current flowing from the stud 5 when the stud 5 is disengaged from the base material 7 but voltage is supplied from the welding power supply 11 between the stud 5 and the base material 7. The detector in the sequence controller 13 detects the change in voltage due to the change in current, and sequence controller 13 determines that the disengagement position has been reached in which the stud 5 is disengaged from the base material 7. In another example, a detector is disposed in the controller 3 in which the current is detected in series between terminal 15 on the welding power source 11 and the stud 5 as well as between terminal 16 and the base material 7. The current flowing from the welding power source 11 through the stud 5 and the base material 7 is detected, and the stud disengagement position is detected based on the change in current from when the stud was in contact to when the stud is disengaged. The welding start signal is sent to the sequence controller 13 from input terminal 17 on the controller 3.

Figure 2:
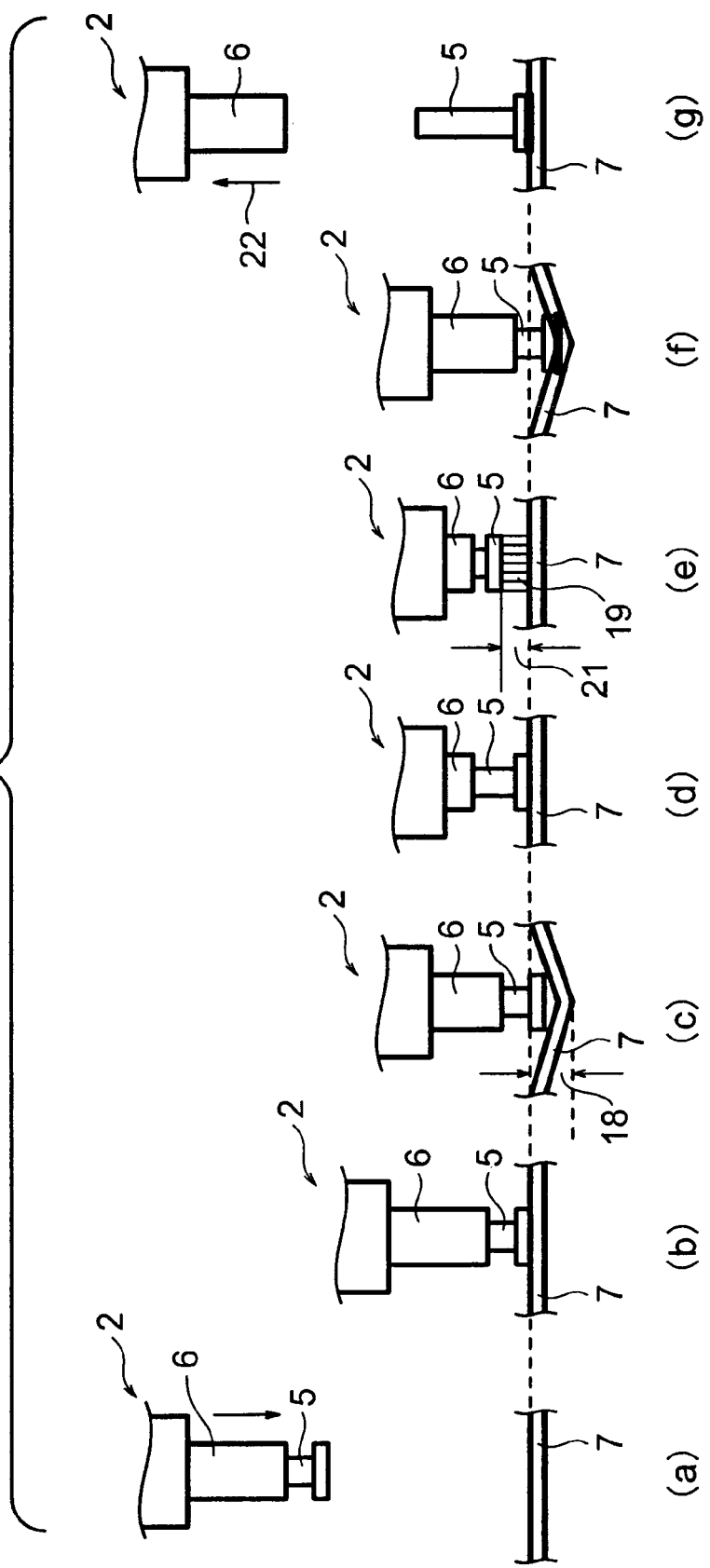
FIGS. 2(a) through (g) are diagrams used to explain a welding operation performed by the arc stud welding device.

The following is an explanation of an operation performed by an arc stud welding device 1 of the invention to weld a stud 5 at a predetermined position on the base material 7, with reference to FIGS 2 (a) through (g). In FIG 2 (a), the stud 5 is held in the stud holder 6 on the stud welding gun 2 and positioned at a predetermined position over the base material 7. After the positioning, as shown in FIG 2 (b) the linear motor 9 in the stud welding gun 2 is operated and the stud holder 6 is lowered to bring the stud 5 into contact with the base material 7. Next, as shown in FIG 2 (c), the stud 5 is pressed down onto the base material 7 in order to make sure contact has been established with the base material 7. If the base material 7 is not rigid, the pressure from the stud 5 dents the welded portion of the base material 7 to a certain sink-in depth 18, as shown in FIG 2 (c). The sink-in depth itself is not a problem due to the plasticity of the base material 7, but often the depth has an adverse effect on the generation of an arc discharge.

After the stud 5 has been pressed down into the base material 7 and electrical contact has been reliably established between the stud 5 and the base material 7, a welding start signal is sent to the input terminal 17 of the controller 3. When the welding start signal has been received, the sequence controller 13 sends a stud pull up signal to the gun controller 14, and a stud pull up signal is sent from the gun controller 14 to the linear motor 9.

The linear motor 9 pulls up the stud holder 6, the stud 5 is pulled up from the base material 7, and position signals are sent from the position sensor 10 to the sequence controller 13 in the controller 3. When the stud 5 is pulled up, the pressure on the base material 7 is released and, as shown in FIG. 2 (*d*), the base material 7 returns to its original flat shape. Because the stud 5 remains in contact with the base material 7 while the base material 7 returns to its original shape, the stud 5 remains in electrical contact with the base material 7. When the welding start signal is received by the sequence controller 13, the welding power source 11 begins supplying power to the stud 5 and the base material 7. However, while the stud 5 remains in electrical contact with the base material 7, as shown in FIG. 2 (*d*), there is a flow of current from the stud 5 to the base material 7 but the voltage between terminal 15 and terminal 16 is nearly zero. As the stud 5 being pulled up disengages from the base material 7, the current from stud 5 to base material 7 is gradually reduced, and the voltage between terminal 15 and terminal 16 is gradually increased. The detector in the sequence controller 13 detects the change in the current flowing through the stud 5 and the base material 7 (i.e., the change in voltage), and instantly detects the point at which the stud 5 disengages from the base material 7. A position signal is sent to the sequence controller 13 from the position sensor 10 in the stud welding gun 2, and the position at the instant the stud 5 disengages from the base material 7 is detected as the disengagement position.

When the disengagement position is detected, the sequence controller 13 supplies a somewhat larger amount of power from the welding power source 11 to the stud 5 and base material 7 to generate a pilot arc between the stud 5 and the base material 7. When the disengagement position is detected, the sequence controller 13 also sets the position signal from the position sensor 10 as the reference position or distance zero between the stud and the base material. The sequence controller 13 performs the stud pull up operation until the linear motor 9 receives from the position sensor 10 via the gun controller 14 a position signal corresponding to a predetermined pull up length from the reference position. The pilot arc is generated while the stud 5 is being pulled up. Afterwards, the sequence controller 13 increases the power supplied from the welding power source 11 to generate a main arc discharge between the stud 5 and the base material 7. FIG. 2 (*e*) shows a main arc 19 generated between the stud 5 and the base material 7. The length between the stud 5 and the base material 7 is the arc length of the main arc. Because the stud 5 and the base material 7 continue to pull apart after the disengagement position of the stud 5 from the base material 7 and until a predetermined height has been reached (i.e., the position corresponding to a predetermined arc length 21), the arc length 21 eventually reaches an ensured predetermined height (predetermined arc length 21) above the portion of the base material that has been dented by pressure from the stud 5 after it has returned to its original flat shape. As a result, the main arc discharge is correct when the main arc is generated, and poor welding due to improper stud pull up is avoided.

When the main arc has been continued for a predetermined length of time and the flange portion of the stud 5 and the portion of the base material 7 at the predetermined portion have been melted, a signal is outputted via the gun controller 14 to the linear motor 9 from the sequence controller 13 to lower the stud 5, and the melted portion of the stud 5 is pressed into the melted portion of the base material 7. This pressed down state is shown in FIG. 2 (*f*). When the stud 5 tip is pressed down into the melted portion of the base material 7, the stud 5 is welded to the base material 7 and fixed in place. The sequence controller 13 sends a signal to the stud holder 6 to release the stud 5, the entire stud welding gun 2 moves in the direction of arrow 22, and the stud 5 remains fixed in place on the base material 7. With this, the stud welding operation is complete.

While preferred embodiments of the invention have been shown and described, modifications can be made without departing from the principles and spirit of the invention, the scope of which is defined in the appended claims.

What is claimed is:

1. An arc stud welding device comprising a welding gun holding a stud at a tip, a linear motor for bringing the held stud into contact with, and disengaging the stud from contact with, a base material, a position sensor for detecting the position of the stud held at the tip of the welding gun with respect to the base material, a power source for supplying power to the stud held at the tip of the welding gun and the base material, and a controller for generating an arc discharge between the stud and the base material to weld the stud to the base material, wherein the controller applies power from the power source to the base material and the stud in contact with the base material, operates the linear motor to pull up the stud from the base material, generates a main arc with a main current after a pilot arc has been generated, and operates the linear motor to press the stud against the base material and weld the stud to the base material, and wherein the controller includes a disengagement detector for detecting when the stud disengages from the base material, and the controller receives a signal from the position sensor when the stud disengages from the base material, to establish a disengaged position, and the linear motor is then operated to pull up the stud from the disengaged position to a predetermined position that is a predetermined distance from the disengaged position.

2. An arc stud welding device comprising a welding gun holding a stud at a tip, a linear motor for bringing the held stud into contact with, and disengaging the stud from contact with, a base material, a position sensor for detecting the position of the stud held at the tip of the welding gun with respect to the base material, a power source for supplying power to the stud held at the tip of the welding gun and the base material, and a controller for generating an arc discharge between the stud and the base material to weld the stud to the base material, wherein the controller applies power from the power source to the base material and the stud in contact with the base material, operates the linear motor to pull up the stud from the base material, generates a main arc with a main current after a pilot arc has been generated, and operates the linear motor to press the stud against the base material and weld the stud to the base material, and wherein the controller receives a signal from the position sensor when the stud disengages from the base material, to detect a disengaged position, and the linear motor is then operated to pull up the stud from the disengaged position to a predetermined position, wherein the device includes a detector for detecting electric current flowing from the power source through the stud and the base material, and wherein the controller detects the disengaged position responsive to a change in the electric current due to the disengagement of the stud from the base material.

3. Device described in claim 2, wherein the position sensor outputs position signals indicating distance the stud has moved, wherein the controller identifies a position signal from the position sensor when the disengagement position has been detected as a reference position, and wherein the controller performs a stud pull up operation with the linear motor until a position signal corresponding to a predetermined pull up distance from the reference position has been received from the position sensor.

4. An arc welding method in which a stud is moved into contact with a base material that is temporarily dented by the contact and is then moved away from the base material after it returns from being dented, while an arc discharge is generated between the stud and the base material, wherein:

a disengagement position at which the stud is disengaged from the returned base material is detected; and the stud is moved away from the disengagement position by a predetermined distance.

5. A method according to claim 4, wherein the disengagement position is detected in response to a change in current or voltage between the stud and the base material.

6. A method according to claim 4, wherein movement of the stud relative to the base material is monitored by a position sensor.

* * * * *